US012641505B2

(12) United States Patent
Rasanen et al.

(10) Patent No.: US 12,641,505 B2
(45) Date of Patent: *May 26, 2026

(54) METHOD AND APPARATUS FOR IMPLEMENTING MOBILE EDGE APPLICATION SESSION CONNECTIVITY AND MOBILITY

(71) Applicant: NOKIA SOLUTIONS AND NETWORKS OY, Espoo (FI)

(72) Inventors: John Juha Antero Rasanen, Espoo (FI); Pekka Kuure, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/072,901

(22) PCT Filed: Jan. 27, 2017

(86) PCT No.: PCT/EP2017/051765
§ 371 (c)(1),
(2) Date: Jul. 26, 2018

(87) PCT Pub. No.: WO2017/129742
PCT Pub. Date: Aug. 3, 2017

(65) Prior Publication Data
US 2019/0045409 A1 Feb. 7, 2019

Related U.S. Application Data

(60) Provisional application No. 62/287,747, filed on Jan. 27, 2016.

(51) Int. Cl.
*H04W 36/12* (2009.01)
*H04W 36/00* (2009.01)
(Continued)

(52) U.S. Cl.
CPC ....... *H04W 36/12* (2013.01); *H04W 36/0016* (2013.01); *H04W 36/36* (2013.01); *H04W 88/16* (2013.01)

(58) Field of Classification Search
CPC . H04W 36/12; H04W 36/0016; H04W 36/36; H04W 36/30; H04W 36/0011;
(Continued)

(56) References Cited

U.S. PATENT DOCUMENTS 7,957,287 B2 * 6/2011 Venkatachalam ........................... H04W 36/0007 370/232
2003/0058874 A1 3/2003 Sahaya et al.
(Continued)

FOREIGN PATENT DOCUMENTS

CN 108886718 A 11/2018
WO WO 2007/038947 A1 4/2007

OTHER PUBLICATIONS

International Search Report & Written Opinion dated Jun. 21, 2017 corresponding to International Patent Application No. PCT/EP2017/051765.
(Continued)

*Primary Examiner* — Un C Cho
*Assistant Examiner* — Rasha K Fayed
(74) *Attorney, Agent, or Firm* — SQUIRE PATTON BOGGS (US) LLP

(57) ABSTRACT

A method and apparatus may include detecting a handover that is requested by a user equipment. The user equipment moves from a first area of a first mobile-edge-computing server to a second area of a second mobile-edge-computing server. The method may also include determining whether the user equipment has an ongoing application session with the first mobile-edge-computing server. The method may
(Continued)

| eNB 1 | eNB 2 | MEC 1 | MEC 2 | MME | DB |
|---|---|---|---|---|---|

1. Path Switch Request [Parameters]

2. MEC-2 detects the requested handover, e.g. from handover signalling (step 1) or from info from RNIS, but does not know from where and/or whether the UE has an ongoing session using MEC.

3. Request [User/UE ID/Addr, Parameters]

4. Response [MEC-1 ID/Addr, TFT, MEC appl ID/params, Session ID]

5. MEC-2 notices that it is able to handle the MEC application. However, MEC-2 may prepare to route to/from MEC-1 according to the TFT to avoid loss of data during the possible move of the application session.

6. Request to move session [User/UE and/or Session ID, ...]

7. Response [YES/NO, If YES: Session Parameters]

8. If MEC-1 responds with NO, MEC-2 goes on routing the UE / MEC session related traffic to/from MEC-1. If MEC-1 responds with YES (plus possible session parameters), MEC-2 starts handling the session and stops routing the UE / MEC session related traffic to/from MEC-1.

also include determining whether the ongoing application session should be moved from the first mobile-edge-computing server to the second mobile-edge-computing server, if the user equipment has been determined to have an ongoing application session. The method may also include moving the ongoing application session from the first mobile-edge-computing server to the second mobile-edge-computing server, if the application session has been determined to be moved.

19 Claims, 9 Drawing Sheets

(51) Int. Cl.
   *H04W 36/36*          (2009.01)
   *H04W 88/16*          (2009.01)

(58) Field of Classification Search
   CPC . H04W 36/10; H04W 36/06; H04W 36/0033; H04W 36/26; H04W 36/00; H04W 36/14; H04W 88/16; H04W 88/085; H04W 88/182; H04W 88/005; H04W 88/08; H04W 88/18; H04W 4/00; H04W 4/023; H04W 4/005; H04W 4/70; H04W 4/08; H04W 76/10; H04W 76/02; H04W 76/021; H04W 76/11; H04W 12/06; H04W 64/00; H04L 67/02; H04L 67/1097; H04L 67/22; H04L 67/2819; H04L 47/10; H04L 47/22; H04L 47/14; H04L 41/0681; H04L 41/0686; H04L 41/5054; H04L 41/0893; H04L 29/06
   See application file for complete search history.

(56)              References Cited

U.S. PATENT DOCUMENTS

| | | | | |
|---|---|---|---|---|
| 2004/0233866 | A1* | 11/2004 | Bossoli | H04L 67/04 |
| | | | | 370/328 |
| 2006/0234744 | A1* | 10/2006 | Sung | H04L 65/4061 |
| | | | | 455/518 |
| 2007/0189220 | A1* | 8/2007 | Oberle | H04L 29/06027 |
| | | | | 370/331 |
| 2008/0263219 | A1* | 10/2008 | Bacchi | H04L 65/65 |
| | | | | 709/231 |
| 2010/0284369 | A1* | 11/2010 | Chu | H04L 45/00 |
| | | | | 370/331 |
| 2011/0058520 | A1* | 3/2011 | Keller | H04W 76/11 |
| | | | | 370/328 |
| 2011/0223885 | A1* | 9/2011 | Salkintzis | H04W 36/0016 |
| | | | | 455/411 |
| 2012/0063420 | A1* | 3/2012 | Long | H04W 4/16 |
| | | | | 370/331 |
| 2012/0164979 | A1 | 6/2012 | Bachmann et al. | |
| 2013/0301466 | A1* | 11/2013 | Nenner | H04W 36/0079 |
| | | | | 370/252 |
| 2014/0022985 | A1* | 1/2014 | Kalmbach | H04W 88/08 |
| | | | | 370/328 |
| 2014/0050103 | A1* | 2/2014 | Niu | H04W 4/00 |
| | | | | 370/252 |
| 2014/0064249 | A1* | 3/2014 | Lee | H04W 36/023 |
| | | | | 370/331 |
| 2014/0113637 | A1* | 4/2014 | Guan | H04W 8/082 |
| | | | | 455/437 |
| 2014/0177590 | A1* | 6/2014 | Sirotkin | H04N 21/25833 |
| | | | | 370/331 |
| 2014/0194111 | A1* | 7/2014 | Aso | H04W 52/0235 |
| | | | | 455/419 |
| 2014/0256323 | A1* | 9/2014 | Edge | H04W 64/00 |
| | | | | 455/436 |
| 2014/0307708 | A1* | 10/2014 | Son | H04W 36/0058 |
| | | | | 370/331 |
| 2014/0379901 | A1* | 12/2014 | Tseitlin | H04L 43/08 |
| | | | | 709/224 |
| 2015/0016420 | A1* | 1/2015 | Balabhadruni | H04W 4/90 |
| | | | | 370/331 |
| 2015/0058406 | A1* | 2/2015 | Rezvani | H04L 12/2801 |
| | | | | 709/203 |
| 2015/0200802 | A1* | 7/2015 | Sawal | H04L 45/22 |
| | | | | 370/228 |
| 2015/0201394 | A1* | 7/2015 | Qu | H04W 4/20 |
| | | | | 455/456.1 |
| 2015/0208306 | A1* | 7/2015 | Kotecha | H04W 36/18 |
| | | | | 455/436 |
| 2015/0373149 | A1* | 12/2015 | Lyons | G05B 17/02 |
| | | | | 709/203 |
| 2016/0088114 | A1* | 3/2016 | Kim | H04L 12/2834 |
| | | | | 709/214 |
| 2016/0094467 | A1* | 3/2016 | Hong | H04L 47/2441 |
| | | | | 370/235 |
| 2016/0134932 | A1* | 5/2016 | Karp | G05B 13/04 |
| | | | | 348/207.11 |
| 2016/0170773 | A1* | 6/2016 | Franck | G06F 9/4406 |
| | | | | 713/2 |
| 2016/0183144 | A1* | 6/2016 | Vallabhu | H04W 36/0011 |
| | | | | 370/331 |
| 2016/0205028 | A1* | 7/2016 | Luna | H04L 47/122 |
| | | | | 709/233 |
| 2016/0212666 | A1* | 7/2016 | Zalzalah | H04W 36/14 |
| 2016/0219476 | A1* | 7/2016 | Onishi | H04W 28/023 |
| 2016/0225403 | A1* | 8/2016 | Hostetter | G11B 27/36 |
| 2016/0344690 | A1* | 11/2016 | Keis | H04L 61/5007 |
| 2017/0093700 | A1* | 3/2017 | Gilley | H04L 45/44 |
| 2017/0244593 | A1* | 8/2017 | Rangasamy | H04L 67/1097 |
| 2017/0257257 | A1* | 9/2017 | Dawes | H04L 67/025 |
| 2017/0265057 | A1* | 9/2017 | Zhang | H04W 48/04 |
| 2018/0242204 | A1* | 8/2018 | Zhu | H04W 36/18 |
| 2019/0028934 | A1 | 1/2019 | Rasanen et al. | |

OTHER PUBLICATIONS

Intel: "Discussion Paper on ETSI Mobile-Edge Computing (MEC) and its Relevance to 3GPP Multimedia Services," 3GPP Draft; S4-150757, 3GPP TSG-SA4 Meeting #84, Rennes, France, Jul. 6-10, 2015, XP050987072.

ETSI Mobile-Edge Computing—Introductory Technical White Paper; 2014; Huawei et al.

3GPP 3GPP TS 23.401 V13.5.0 (Dec. 2015); 2015; 3rd Generation Partnership Project; Technical Specification Group Services and System Aspects; General Packet Radio Service (GPRS) enhancements for Evolved Universal Terrestrial Radio Access Network (E-UTRAN) access (Release 13).

Chinese Office Action issued in corresponding Chinese Patent Application No. 201780020426.5 on Jun. 28, 2020.

MEC Mobility Management, Fabio Giust: NEC Europe Ltd, ETSI, Jul. 14, 2015; 10 pages, Jul. 14, 2015.

Indian Office Action issued in corresponding Indian Patent Application No. 201817026650 on Jul. 27, 2020.

\* cited by examiner

METHOD AND APPARATUS FOR IMPLEMENTING MOBILE EDGE APPLICATION SESSION CONNECTIVITY AND MOBILITY

FIELD

The present invention relates to implementing connectivity and mobility. More specifically, the present invention exemplarily relates to measures (including methods, apparatuses and computer program products) for implementing connectivity and mobility.

BACKGROUND

Long-term Evolution (LTE) is a standard for wireless communication that seeks to provide improved speed and capacity for wireless communications by using new modulation/signal processing techniques. The standard was proposed by the 3rd Generation Partnership Project (3GPP), and is based upon previous network technologies. Since its inception, LTE has seen extensive deployment in a wide variety of contexts involving the communication of data.

SUMMARY

Various aspects of exemplary embodiments of the present invention are set out in the appended claims.

According to an exemplary aspect of the present invention, there is provided an apparatus including at least one processor and at least one memory including computer program code. The at least one memory and the computer program code are configured, with the at least one processor, to cause the apparatus at least to detect a handover that is requested by a user equipment. The user equipment moves from a first area of a first mobile-edge-computing server to a second area of a second mobile-edge-computing server. The apparatus is also caused to determine whether the user equipment has an ongoing application session with the first mobile-edge-computing server. The apparatus is also caused to determine whether the ongoing application session should be moved from the first mobile-edge-computing server to the second mobile-edge-computing server, if the user equipment has been determined to have an ongoing application session. The apparatus is also caused to move the ongoing application session from the first mobile-edge-computing server to the second mobile-edge-computing server, if the application session has been determined to be moved.

In the apparatus of this exemplary aspect of the present invention, the apparatus may be further caused to identify the application of the ongoing application session. Identifying the application may include identifying a unique internet protocol address of the application.

In the apparatus of this exemplary aspect of the present invention, the apparatus may include either the first mobile-edge-computing server or the second mobile-edge-computing server.

In the apparatus of this exemplary aspect of the present invention, the detecting the handover may include detecting the handover based on signalling of the handover and/or on information from a radio network information service.

In the apparatus of this exemplary aspect of the present invention, the apparatus may also be caused to transmit a request to a database. The request may include a request for the identity or address of the first mobile-edge-computing server.

In the apparatus of this exemplary aspect of the present invention, the apparatus may also be caused to inform a controller/orchestrator about the handover.

According to a further exemplary aspect of the present invention, a method includes detecting, by a detecting mobile-edge-computing server, a handover that is requested by a user equipment. The user equipment moves from a first area of a first mobile-edge-computing server to a second area of a second mobile-edge-computing server. The method also includes determining whether the user equipment has an ongoing application session with the first mobile-edge-computing server. The method also includes determining whether the ongoing application session should be moved from the first mobile-edge-computing server to the second mobile-edge-computing server, if the user equipment has been determined to have an ongoing application session. The method also includes moving the ongoing application session from the first mobile-edge-computing server to the second mobile-edge-computing server, if the application session has been determined to be moved.

In the method of this exemplary aspect of the present invention, the method may also include identifying the application of the ongoing application session. Identifying the application may include identifying a unique internet protocol address of the application.

In the method of this exemplary aspect of the present invention, the detecting mobile-edge-computing server may include either the first mobile-edge-computing server or the second mobile-edge-computing server.

In the method of this exemplary aspect of the present invention, the detecting the handover may include detecting the handover based on signalling of the handover and/or on information from a radio network information service.

In the method of this exemplary aspect of the present invention, the method may also include transmitting a request to a database. The request may include a request for the identity or address of the first mobile-edge-computing server.

In the method of this exemplary aspect of the present invention, the method may also include informing a controller/orchestrator about the handover.

According to a further exemplary aspect of the present invention, there is provided an apparatus, comprising a detecting unit configured to detect a handover that is requested by a user equipment, wherein the user equipment moves from a first area of a first mobile-edge-computing server to a second area of a second mobile-edge-computing server, a first determining unit configured to determine whether the user equipment has an ongoing application session with the first mobile-edge-computing server, a second determining unit configured to determine whether the ongoing application session should be moved from the first mobile-edge-computing server to the second mobile-edge-computing server, if the user equipment has been determined to have an ongoing application session, and a moving unit configured to move the ongoing application session from the first mobile-edge-computing server to the second mobile-edge-computing server, if the application session has been determined to be moved.

According to a further exemplary aspect of the present invention, there is provided an apparatus for managing all mobile-edge-computing servers in a network, comprising at least one processor, and at least one memory including computer program code, the at least one processor, with the at least one memory and the computer program code, being configured to cause the apparatus to perform providing said all mobile-edge-computing servers in said network with mobile edge system information, wherein said mobile edge system information includes information on said all mobile-edge-computing servers in said network and applications available in said network or a subset thereof based on a certain geographical area.

According to a further exemplary aspect of the present invention, there is provided a method for managing all mobile-edge-computing servers in a network, comprising providing said all mobile-edge-computing servers in said network with mobile edge system information, wherein said mobile edge system information includes information on said all mobile-edge-computing servers in said network and applications available in said network or a subset thereof based on a certain geographical area.

According to a further exemplary aspect of the present invention, there is provided a computer program product comprising computer-executable computer program code which, when the program is run on a processor (e.g. a processor of an apparatus according to any one of the aforementioned apparatus-related exemplary aspects of the present invention), is configured to cause the processor to carry out the method according to any one of the aforementioned method-related exemplary aspects of the present invention.

Such computer program product may comprise (or be embodied) a (non-transitory) computer-readable (storage) medium or the like on which the computer-executable computer program code is stored.

These and further aspects of the present invention are derivable from the detailed description below.

By way of exemplary embodiments of the present invention, there are provided measures and mechanisms for implementing connectivity and mobility.

BRIEF DESCRIPTION OF THE DRAWINGS

In the following, for proper understanding of the present invention, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
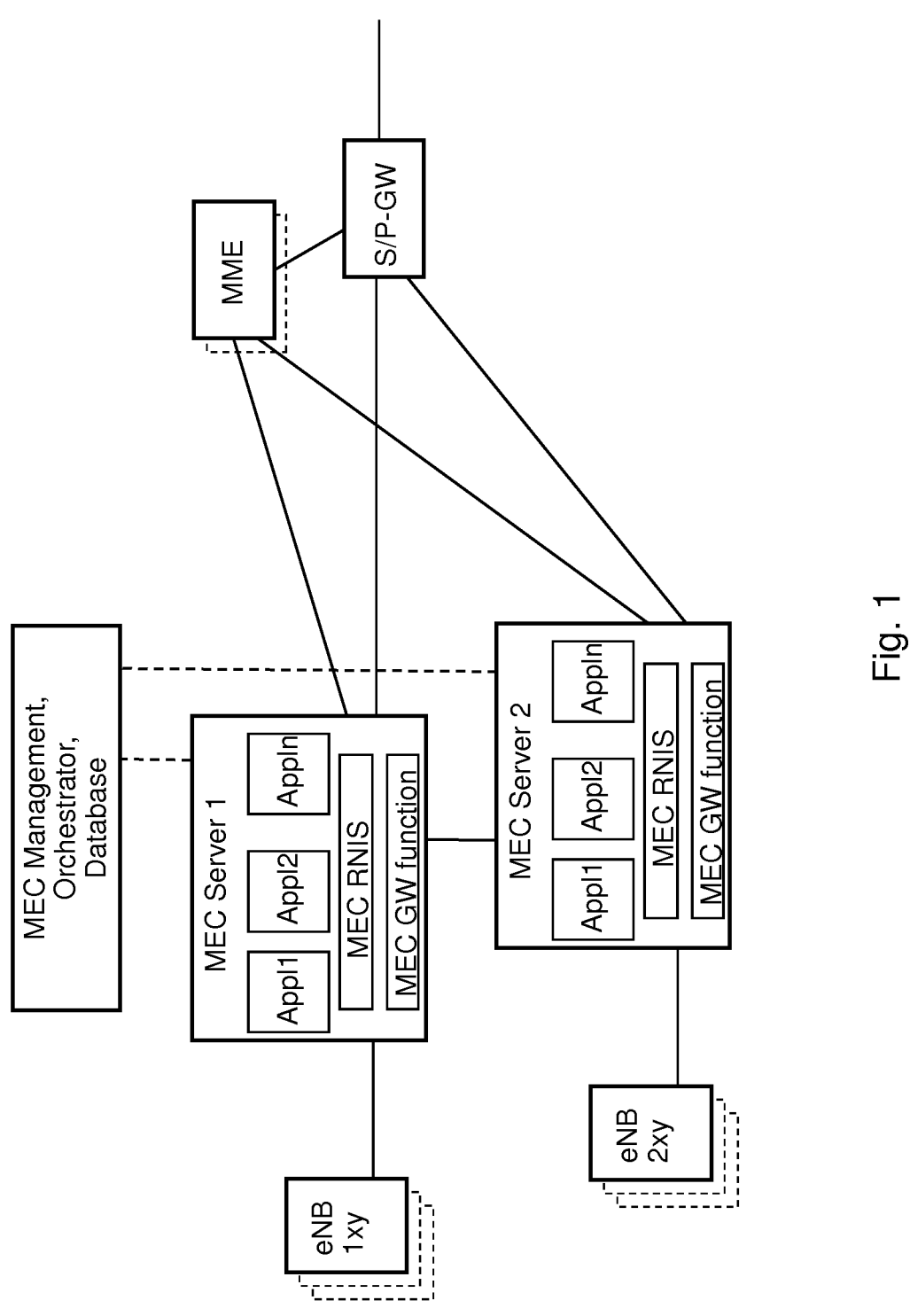
FIG. 1 illustrates a simplified network architecture with 3GPP Evolved Packet Core (EPC), in accordance with the previous approaches.

The present invention is described herein with reference to particular non-limiting examples and to what are presently considered to be conceivable embodiments of the present invention. A person skilled in the art will appreciate that the invention is by no means limited to these examples, and may be more broadly applied.

Certain embodiments of the present invention relate to implementing connectivity and mobility with mobile edge computing. European Telecommunications Standards Institute (ETSI) Industry Specification Groups (ISG) Mobile Edge Computing (MEC) is standardizing mobile edge computing.

MEC may support different kinds of connectivity scenarios. Applications and services that are offered by a MEC server can be used by 3GPP mobile network users/subscribers. The applications and services can be used either in sessions between a user equipment (UE) and an MEC server, or as intermediate data flow manipulators in sessions between a UE and the internet, for example.

Further, MEC may support different mobility scenarios. For example, a UE may move from one MEC server to another MEC server. It is currently assumed that, depending on the case and/or conditions, the Internet Protocol (IP) address of the UE may change or may stay unchanged during mobility.

MEC is supposed to work in both the forthcoming 5G environment and in the current 3GPP Evolved Packet Core (EPC) environment. Providing session continuity for a UE is difficult/problematic with mobility scenarios where the UE moves from the area of one MEC server to the area of another MEC server. In order to initiate the proper actions during these mobility scenarios, the involved MEC servers should somehow determine/detect that a handover has taken place and that the UE has left the area of a MEC server and/or has entered into the area of another MEC server.

Currently, it is not clear how the new MEC server should determine/detect that there is an ongoing user/UE session that uses a MEC application and that needs handling during a mobility scenario in order to guarantee session continuity.

The MEC servers should somehow know about each other and also know about each other's capabilities, and consequently, the MEC servers should be able to agree on what to do. For example, the MEC servers should agree upon whether or not to route a session to/via an original MEC server or to move the session to a new MEC server.

Further problems and complications may be caused by a change of an IP address of the MEC application, if/when the session moves from the area of one MEC server to the area of another MEC server. In some scenarios, even the IP address of the UE may change, when the UE moves from the area of one MEC server to the area of another MEC server. It cannot be assumed that all applications can tolerate the change of the UE's IP address during an ongoing session.

The forthcoming 5G environment may bring about more flexibility in solving at least some of the issues described above. However, the current working assumption is that MEC shall not cause changes in the current 3GPP EPC.

Previous approaches for providing session continuity have been described in ETSI ISG MEC meeting reports and draft specifications. Other previous approaches are described in Mobile-Edge Computing—Introductory Technical White Paper. The currently-assumed architectural environment with 3GPP EPC is illustrated by the simplified example of FIG. 1. Further details concerning MEC can be found in the White Paper. Further details concerning the 3GPP network can be found, for example, in 3GPP Technical Specification 23.401.

In this environment, a UE may establish an Internet Protocol (IP) context with the Packet Data Network Gateway (P-GW), and the UE gets an IP address from the P-GW. MEC servers reside on the path between evolved Node Bs (eNBs) and Mobility Management Entities/Serving Gateways (MME/S-GW). As long as a UE maintains an IP context with the P-GW, the IP address of the UE does not change. A MEC server may detect a UE's traffic and may route the traffic to (or via) an application in the MEC server.

With certain embodiments of the present invention, Mobile Edge Servers in the network (which comprise a Mobile Edge System, for example) are managed by Mobile Edge Orchestrator (MEO) function. MEO may have visibility over the entire network. MEO may provide detailed Mobile Edge System information to all Mobile Edge Servers in the network. The detailed Mobile Edge system information that is provided may be full system information or a subset of Mobile Edge system information. Full system information may comprise information on all Mobile Edge Servers in the network. A subset of Mobile Edge system information may comprise information on only certain specific Mobile Edge servers in a defined geographical area, for example.

The detailed Mobile Edge system information may include, but is not limited to the following: ID of all ME Servers, IP addresses of all Mobile Edge servers, eNB Identifiers connected to a ME Server, IP addresses of an eNB, Geolocation of an eNB, ME Application IDs of all applications available in the ME system (for example, based on a service catalog or an application catalog), estimated latencies between eNB and ME Servers, estimated latencies between ME Servers, and/or MEC Applications requirements.

With certain embodiments of the present invention, Mobile Edge servers may exchange information with each other on the available applications and ongoing Mobile Edge sessions. A Mobile Edge server may identify related Mobile Edge servers based on detailed mobile Edge system information received from the MEO, and by combining the information received from RNIS on indicated eNB identifiers and the received detailed Mobile Edge system information.

Radio Network Information Service (RNIS) is a service that provides information on radio and network conditions for the Mobile edge Applications and for the mobile edge server. It is assumed that RNIS service and a Mobile edge server may exchange information with each other. For example, if the Mobile edge server has received the detailed Mobile edge system information, it is assumed that RNIS has access to this information.

With certain embodiments of the present invention, a ME server, or RNIS functionality within the Mobile edge server, may identify an oncoming handover of a UE. The oncoming handover may be identified via the control plane signaling between eNBs, or the signaling between eNB and MME. The handover likelihood may possibly be already determined from the Control plane signaling message, where the UE provides measurement information on received signal strengths of the neighboring eNB. In addition, the oncoming handover may be detected by RNIS from a handover preparation message such as "HANDOVER REQUIRED". In addition, the handover may be detected from actual handover messages between eNB and MME, such as "HANDOVER REQUEST".

A Mobile edge server, or RNIS, may receive handover-related information from the control plane for all the UEs whose traffic is traversing through the ME server. The ME server, or RNIS, may prepare to identify the handover events of those UEs that use ME applications by sending a request to receive mapping of the UE IP Address to a Control Plane Identifier, to the Core Network function who has this information. The core network function may be, for example, the MME.

With certain embodiments of the present invention, a Mobile edge server may identify those handover events that concern the Mobile edge application hosted in that ME server. The Mobile edge server may also identify a target Mobile edge server, based on information on a target eNB from the control plane signaling, such as a handover request. The mobile edge server may identify the target Mobile edge server and its address by combining the detailed system information received from MEO along with the eNB ID received from RNIS. Alternatively, the identification procedures may be performed by the RNIS functionality, as it is a function of the Mobile edge server. The identification procedures may use the detailed Mobile edge system information, accessed from the mobile edge server.

Based on identifying the handover event for the Mobile edge session, identifying the Mobile edge application in question, identifying the ID of the target Mobile edge server, and identifying the address of the target Mobile edge server, the detecting Mobile edge server may initiate session continuity coordination procedures with the identified target Mobile edge server.

In session continuation coordination procedures, a source ME server may inform the target ME server about oncoming handover and may provide information on a Mobile edge session that is handed over. The information may include MEC Application IDs, UE Addresses, and/or MEC Application addresses in the source server.

The detecting Mobile edge server may also determine whether the Mobile edge application, that is concerned in the handover procedure, can handle the case of a change in the address. The detecting Mobile Edge server may inspect the Mobile edge application requirements and characteristics that are received within detailed Mobile edge system information, and the detecting Mobile Edge server may determine if the Mobile edge application can handle the change in the address. The detecting mobile edge server may inspect the received detailed system information to determine whether the target mobile edge server has the Mobile edge application hosted, and whether the address is allocated to the Mobile edge application in the target Mobile edge server. If the detecting mobile edge server identifies a change in the address for the specific mobile edge application, the detecting mobile edge server may initiate procedures to maintain the address in the target server.

With certain embodiments of the present invention, the target mobile edge server may receive instructions from the detecting mobile edge server to maintain an IP address. In case of receiving such an instruction, the target mobile edge server may initiate procedures to preserve the address. With address preservation, the target mobile edge server may add Network Address Translation (NAT) functionality between the user equipment and the Mobile edge application in the target mobile edge server. The address to be used may be received from the source mobile edge server in the session continuity coordination procedure.

The target mobile edge server may receive information on a session continuity coordination procedure from the detecting mobile edge server. The received information may be for a Mobile edge application that the target mobile edge server identifies as being not available and hosted in the target mobile edge server. Based on this triggering information, the target mobile edge server may request the instantiation of the mobile edge application from the MEO function.

With certain embodiments of the present invention, mobile edge servers can identify the topology of the network based on received detailed mobile edge system information, and mobile edge servers may initiate procedures to optimize the handover performance, by sending requests to instantiate the same set of mobile edge applications as the related mobile edge servers are hosting, based on determined topology information. As a further improvement, the mobile edge servers may use information received from RNIS, and may determine the probabilities for handover events from other mobile edge servers to this specific mobile edge server. Based on determined probabilities, the mobile edge servers may trigger instantiation procedures to have the same set of applications with the mobile edge server that has this highest probability to transfer mobile edge sessions to this mobile edge server. The term mobile edge server typically refers to a physical infrastructure that hosts the mobile edge platform or mobile edge host.

Figure 2:
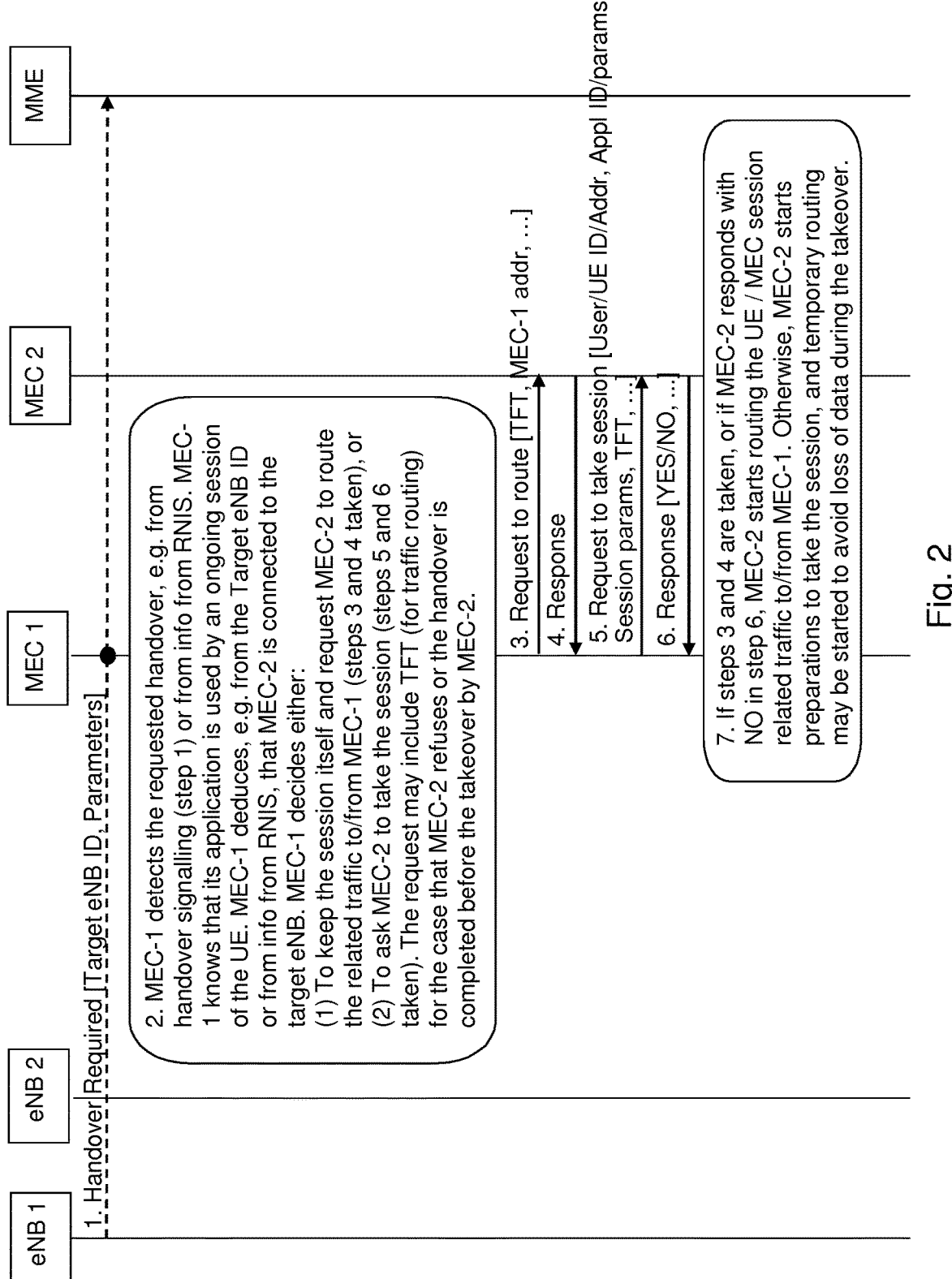
FIG. 2 illustrates handover with a source evolved Node B (eNB) contacting a Mobility Management Entity (MME), in accordance with certain embodiments of the present invention.
Figure 3:
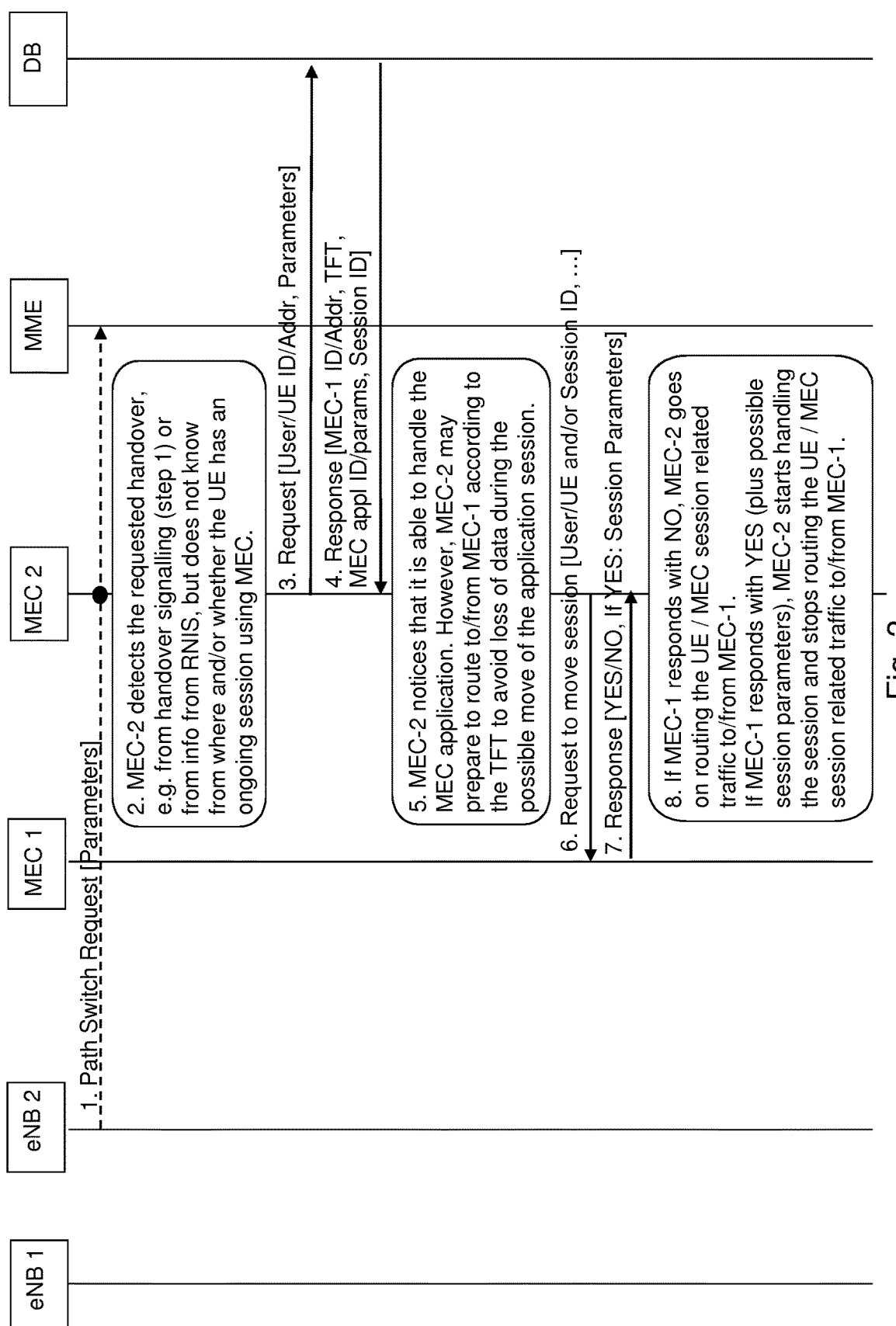
FIG. 3 illustrates handover with a target eNB contacting a MME, in accordance with certain embodiments of the present invention.
Figure 4:
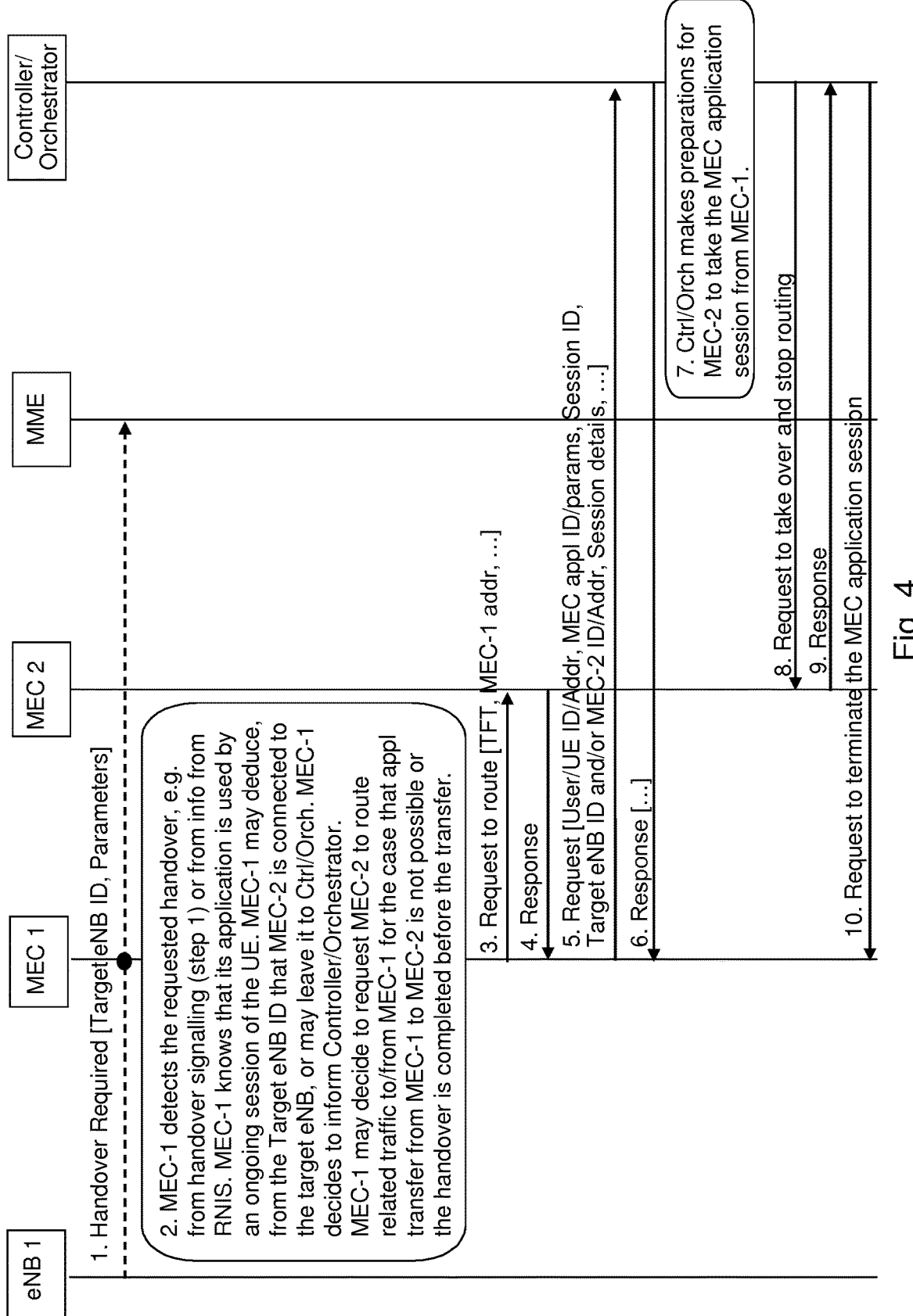
FIG. 4 illustrates handover with a source eNB contacting a MME, where a controller/orchestrator controls Mobile-Edge Computing (MEC) servers, in accordance with certain embodiments of the present invention.
Figure 5:
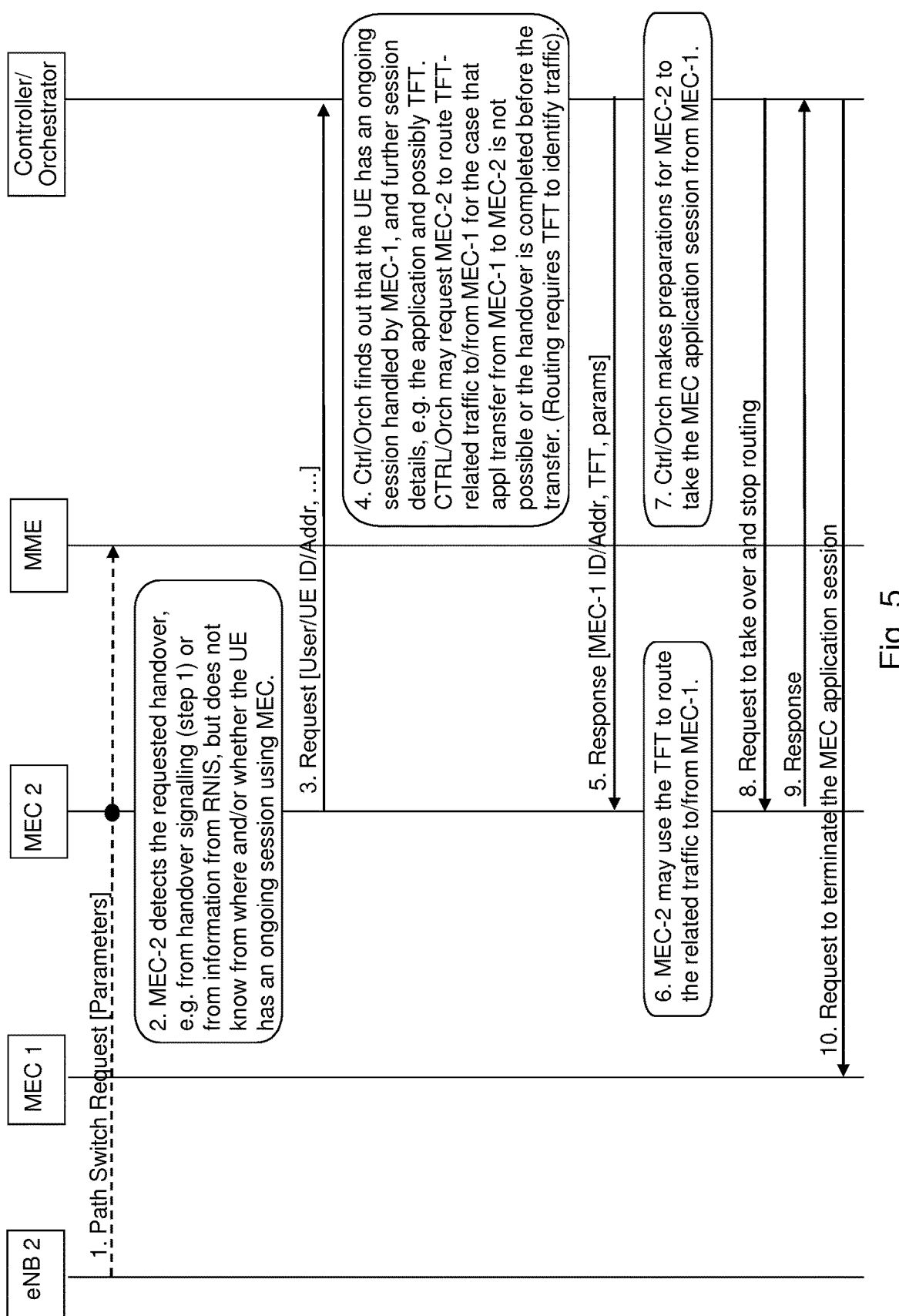
FIG. 5 illustrates handover with a target eNB contacting a MME, where a controller/orchestrator controls MEC servers, in accordance with certain embodiments of the present invention.

FIG. 1 illustrates a simplified network architecture with 3GPP EPC, in accordance with the previous approaches. An MEC server may handle a UE's IP context. The MEC server may detect a handover of the UE from the area of the MEC server to the area of another MEC server. The MEC server that detects the handover may either be the MEC server that the UE's session presently uses when the handover is requested (as shown in FIGS. 2 and 4), or the MEC server that detects the handover may be the new MEC server that corresponds to the area to which the UE is entering upon occurrence of the handover (as shown in FIGS. 3 and 5).

The detection of the handover may occur in different ways. For example, the Radio Network Information Service (RNIS) offered by the MEC platform may become aware of the handover. There are multiple ways how RNIS may get information on the handover events from the connected eNB and MME. RNIS may have direct interfaces with eNBs connected to a MEC Server or Control Plane signaling may traverse through the MEC server, if MEC server sits on control plane path or MEC server may get information of handover events from other network functions responsible of monitoring the Network. As the handover signaling uses UE identifiers that are valid and visible only in the control plane, the MEC server may need to get the mapping of the control plane UE identifiers and the IP address allocated for the UE. This information can be provided, for example, by UE identity service that has the capability to request the information from the Core Network functions such as MME, S-GW, P-GW, and HSS, for example. The UE identifiers that could be used are, for example, International Mobile Subscriber Identity (IMSI), SAE-Temporary Mobile Subscriber Identity (S-TMSI), UE MME S1 Application Protocol (S1AP) ID and S1 S-GW Tunnel Endpoint ID (TEID). Other tunneling endpoint identifiers can also be used, where applicable.

The source MEC server may realize the coming handover via getting information from the RNIS. RNIS can provide information on all handovers in the eNB connected to that MEC server. As MEC Server has the binding between the UE Identifiers used in the control plane and the IP addresses allocated to the UE, the MEC server is able to detect whether the coming handover relates to MEC sessions. In case of target MEC server, the MEC server may realize that the UE that was handed over had a MEC Session based on the IP address where the UE was requesting service.

The detecting MEC server may check whether or not the UE has an ongoing session that uses a MEC application, and, consequently, the detecting MEC server checks/determines whether or not the UE may need measures to guarantee session continuity. Detecting the existence of an ongoing session may take place in different ways. For example, the current MEC server may inherently know if some of its applications are serving the UE (referring to FIG. 2), based on bind information on UE IP address and the UE identities used in control plane. If the new MEC server needs to check the existence of an ongoing MEC session, the new MEC server may also make an inquiry to a MEC session database by using the IP address where the UE is requesting service as a key (referring to FIG. 3). If the new MEC server knows the previous/current MEC server, and if there is a reference point/interface between the servers, the new MEC server may make an inquiry to the current MEC server by using the IP address where the UE is requesting service as a key.

The detecting MEC server may also get/retrieve the identity or address of the other MEC server that is related to the handover. Getting the identity or the address may take place in different ways. For example, a MEC server may fetch the identity or address of the other MEC server from an internal or external database by using the eNB ID as a key (referring to FIGS. 2 and 4). The eNB ID may be received from RNIS or may be in a detected handover message. Another way of getting the identity or the address of the other MEC server could be to fetch the identity or the address from a database using the user/UE identity or address as a key (referring to FIG. 3). The user/UE identity may be received by RNIS from the detected handover message. Another way of getting the identity or the address of the other MEC server could be to get the information from a control entity or orchestrator using the user/UE identity or address as a key (referring to FIG. 5). The information may be obtained from the control entity or orchestrator in the form of a response to a request/message triggered by the detection of the handover, for example.

The new MEC server may prepare to route the user/UE traffic to/from the current MEC server in order to prevent the loss of user data, in case the handover is completed before possible MEC session transfer from the current MEC server to the new MEC server, or in case the session transfer is not performed at all.

The MEC session may now be moved from the current MEC server to the new MEC server. The MEC session may be moved to the new MEC server in order to, for example, minimize the transmission delay, optimize the performance and the usage of resources, etc. The transfer may be triggered in different ways. If the current/original MEC server detected the handover, then the current/original MEC server may request the new MEC server to take the session, referring to FIG. 2. If the new MEC server detected the handover, then the new MEC server may request the current/original MEC server to give/move the session, referring to FIG. 3. If a controller or MEC orchestrator (MEO) manages the operations, the controller or MEO may, after being informed about the handover (by either of the involved MEC servers, for example), then request the new MEC server to take the session and request the current/original MEC server to terminate the application, referring to FIGS. 4 and 5.

When the new MEC server adopts the session, the session stops routing to/from the original MEC server.

Each MEC application may be assumed to have a unique IP address in the network. However, as a further variation/ embodiment, in order to maximize the benefits of the above-described procedures, the following alternative addressing scenario could be applied: each application running on a MEC server may be identified by an IP address that is unique within the MEC server. The same application running on a different MEC server (under the same P-GW with other MEC servers) may have the same IP address. There are two further variants/embodiments of this principle: (1) one embodiment is applied only to applications that do not tolerate/survive IP address changes during an ongoing session, and (2) another embodiment is applied to all applications that are supported by the MEC servers.

Application-specific information can be stored in a database and may be available to, for example, relevant MEC servers. The application-specific information can indicate whether a given application can tolerate/survive an IP address change during an ongoing session, and can provide an indication regarding the uniqueness of the IP address of an application.

A MEC server may use the application-specific information to deduce/determine whether an ongoing MEC application session can be moved to another MEC server, for example. If the MEC server deduces/determines that an ongoing MEC application session can be moved to another MEC server, the MEC may determine which measures are needed. The measures may include, for example, performing application-level procedures due to an IP address change.

One benefit provided by this addressing scenario is that the change of a MEC server during an ongoing session does not cause an IP address change.

In another embodiment, MEC applications may have unique IP addresses in the network, but the impacts which result from changing the IP address (upon the moving of an application from one MEC server to another) may be avoided by having the new MEC server translate the IP address.

Referring to any of FIGS. 2-5, when MEC-2 agrees on receiving an ongoing session from MEC-1, MEC-2 may identify the MEC application. MEC-2 may identify the MEC application, for example, through a received MEC application ID. MEC-2 may make an internal routing, mapping rule, and/or table for the session. This mapping rule may route packets received from the UE to the corresponding MEC application on MEC-2. These routed packets may have been transmitted in the uplink direction. These routed packets may have had a destination address of the MEC application on MEC-1.

Packets sent by MEC-2 to the UE may be considered to be sent in a downlink direction. In the downlink direction, the mapping rule may replace the address of the MEC application on MEC-2 with the address of the corresponding MEC application on MEC-1. The mapping rule may replace the source address of packets sent by MEC-2. Similar routing and/or mapping may also be applied to connections with possible external applications, if the MEC application has any.

Referring to FIG. 1, MEC servers may be on paths between eNBs and S-GW. These MEC servers may guarantee that the traffic goes through the correct MEC server. FIGS. 2-5 illustrate detailed embodiments based on the options described above.

FIG. 2 illustrates handover with a source evolved Node B (eNB) contacting a Mobility Management Entity (MME), in accordance with certain embodiments of the present invention. At step 1, a handover occurs from an eNB-1 of MEC server #1 (MEC-1) to an eNB-2 of MEC server #2 (MEC-2). Messaging related to this handover is exchanged between the eNB and MME. At step 2, MEC-1 detects the requested handover. MEC-1 may detect the requested handover from the handover signalling (of step 1) or from information from RNIS, for example. MEC-1 may know that its application is used by an ongoing session of the UE. MEC-1 determines/ deduces that MEC-2 is connected to the target eNB. MEC-1 may deduce that MEC-2 is connected to the target eNB from the target eNB ID or from information from RNIS, for example. MEC-1 decides either: (1) to keep the session itself and to request MEC-2 to route the related traffic to/from MEC-1 (to take steps 3 and 4), or (2) to ask MEC-2 to take the session (to take steps 5 and 6). The request may include a Traffic Flow Template (TFT) (for traffic routing) in the event that MEC-2 refuses or in the event that the handover is completed before the takeover by MEC-2.

At step 3, if MEC-1 decides to keep the session itself, MEC-1 requests MEC-2 to route the traffic identified by the traffic flow template (TFT) via MEC-1. Even if MEC-1 decides to request MEC-2 to take the session, MEC-1 may request MEC-2 to route the traffic identified by the traffic flow template (TFT) via MEC-1. The request may contain the MEC-1 IP address for the routing. At step 4, MEC-2 sends a response to MEC-1.

At step 5, MEC-1 requests MEC-2 to take the session. The session may be identified, for example, by a user/UE ID, an address, and/or a traffic flow template, included in the request. The request may contain a MEC application ID, which may be used by MEC-2 to check whether MEC-2 is able to support/run the application. Steps 3 and 5 may possibly, as an alternative, be combined within a single message/request. At step 6, MEC-2 sends a response to MEC-1, either agreeing or refusing to take the session.

At step 7, if steps 3 and 4 are taken, or if MEC-2 refuses to take the session and responds with "NO" in step 6, MEC-2 starts routing the UE/MEC session-related traffic to/from MEC-1. Otherwise, MEC-2 starts preparations to take the session, and temporary routing may be started in order to avoid loss of data during the takeover.

FIG. 3 illustrates handover with a target eNB contacting a MME, in accordance with certain embodiments of the present invention. The database (DB) in FIG. 3 may be centralized (e.g., be configured in conjunction with the mobile edge orchestrator/MEO) or be distributed (e.g., have an instance on each neighboring MEC server), as long as all neighboring MEC servers have access to up-to-date information. With certain embodiments, neighboring MEC servers in this context may mean that MEC servers can maintain an ongoing application session (i.e., support session continuity), when a UE moves from the area of one MEC server to the area of another (neighboring) MEC server.

At step 1, a handover occurs from an eNB-1 of MEC server #1 (MEC-1) to an eNB-2 of MEC server #2 (MEC-2). An exchanging of messages relating to the handover may take place between the eNB and MME. At step 2, MEC-2 detects the requested handover but does not know from where and/or whether the UE has an ongoing session using a MEC application. MEC-2 may detect the requested handover, for example, from handover signaling or from information from RNIS.

At step 3, MEC-2 fetches/requests information from a database, using the user/UE ID or address as a key. At step 4, MEC-2 gets a response from the database. The response may indicate the identity or address of the current MEC server (MEC-1) that is on the path of the UE's session before the handover is performed. The response may provide an indication and related parameters regarding whether the UE is currently using a MEC application on MEC-1, for example, by including the MEC application ID or a session ID or both in the response. If the UE has an active MEC session, the response may also provide the traffic flow template(s) (TFT) of the service data flow(s) of the session.

At step 5, MEC-2 notices that MEC-2 is able to handle the MEC application. However, MEC-2 may prepare to route to/from MEC-1 according to the TFT to avoid loss of data during the possible move of the application session. At step 6, MEC-2 requests MEC-1 to allow the session to be moved to MEC-2. The session may be identified, for example, by a user/UE ID or address and/or a session ID, included in the request. At step 7, MEC-1 sends a response to MEC-2, either agreeing to or refusing to move the session to MEC-2. If MEC-1 agrees to move the session, the response may contain the session status and related parameters.

At step 8, if MEC-1 refuses to move the session to MEC-2 and responds with "NO," MEC-2 goes on routing the UE/MEC session related traffic to/from MEC-1. If MEC-1 responds with "YES" (along with possible session parameters), MEC-2 starts handling the session and stops routing the UE/MEC session related traffic to/from MEC-1.

FIG. 4 illustrates handover with a source eNB contacting a MME, where a controller/orchestrator controls Mobile-Edge Computing (MEC) servers, in accordance with certain embodiments of the present invention. At step 1, a handover occurs from an eNB-1 of MEC server #1 (MEC-1) to an eNB-2 of MEC server #2 (MEC-2). Messaging relating to the handover is exchanged between the eNB and MME. At step 2, MEC-1 detects the requested handover. MEC-1 may detect the requested handover, for example, from handover signalling (step 1) or from information from RNIS. MEC-1 knows that its application is used by an ongoing session of the UE. MEC-1 may deduce, from the Target eNB ID, that MEC-2 is connected to the target eNB, or may leave it to Controller/Orchestrator. MEC-1 may decide to inform Controller/Orchestrator. MEC-1 may decide to request MEC-2 to route related traffic to/from MEC-1 in the event that application transfer from MEC-1 to MEC-2 is not possible or the handover is completed before the transfer.

At step 3, MEC-1 may request MEC-2 to route the traffic identified by a traffic flow template (TFT) via MEC-1. The request may contain the MEC-1 IP address for the routing. At step 4, MEC-2 sends a response. At step 5, MEC-1 sends a request/message to the controller/orchestrator to inform the controller/orchestrator about the handover. MEC-1 identifies the UE, for example, by including a user/UE ID or address in the message. Further parameters may include, for example, an MEC application ID, a session ID, a target eNB ID, a target MEC server ID or address, and/or other session related parameters. However, many of the parameters may not be needed in the message, because the controller/orchestrator may keep records of such sessions. Consequently, the controller/orchestrator may already have some of the parameters.

At step 6, the controller/orchestrator sends a response. At step 7, the controller/orchestrator checks whether MEC-2 is capable of supporting and handling the application session. If the controller/orchestrator determines that MEC-2 is capable of supporting and handling the application session, the controller/orchestrator makes preparations for MEC-2 to take the MEC application session from MEC-1. At step 8, the controller/orchestrator requests MEC-2 to take the session and to stop routing. At step 9, MEC-2 sends a response.

At step 10, the controller/orchestrator requests MEC-1 to terminate the application session.

FIG. 5 illustrates handover with a target eNB contacting a MME, where a controller/orchestrator controls MEC servers, in accordance with certain embodiments of the present invention. At step 1, a handover occurs from an eNB-1 of MEC server #1 (MEC-1) to an eNB-2 of MEC server #2 (MEC-2). Related messaging is exchanged between the eNB and MME. At step 2, MEC-2 detects the requested handover but does not know from where and/or whether the UE has an ongoing session using MEC. MEC-2 may detect the requested handover, for example, from handover signalling (step 1) or from information from RNIS. At step 3, MEC-2 sends a request/message to the controller/orchestrator to inform the controller/orchestrator about the handover. MEC-2 identifies the UE, for example, by including a user/UE ID or address in the message.

At step 4, the Controller/Orchestrator may determine that the UE has an ongoing session handled by MEC-1. The controller/orchestrator may also determine further session details such as, for example, the application/application ID and/or session ID and possibly the traffic flow template (TFT). The controller/orchestrator may request MEC-2 to route TFT-related traffic to/from MEC-1 in the event that application transfer from MEC-1 to MEC-2 is not possible, or if the handover is completed before the transfer. The routing may need a TFT to identify traffic. At step 5, the controller/Orchestrator sends a response to MEC-2. The response may contain an indication and/or parameters on routing the session related data flows via MEC-1. The parameters in the response may comprise, for example, a MEC-1 ID/address and the traffic flow template(s) (TFT) of the data flow(s) to be routed via MEC-1. At step 6, MEC-2 may use the TFT to route the related traffic to/from MEC-1.

At step 7, the controller/orchestrator checks whether MEC-2 is capable of supporting and handling the application session. If the controller/orchestrator determines that MEC-2 is capable of supporting and handling the application session, the controller/orchestrator makes preparations for MEC-2 to take the MEC application session from MEC-1. At step 8, the controller/orchestrator requests MEC-2 to take the session and stop routing. Steps 5 and 8 may possibly, as an alternative, be combined within a single message/request. At step 9, MEC-2 sends a response. At step 10, the controller/orchestrator requests MEC-1 to terminate the application session.

Figure 6:
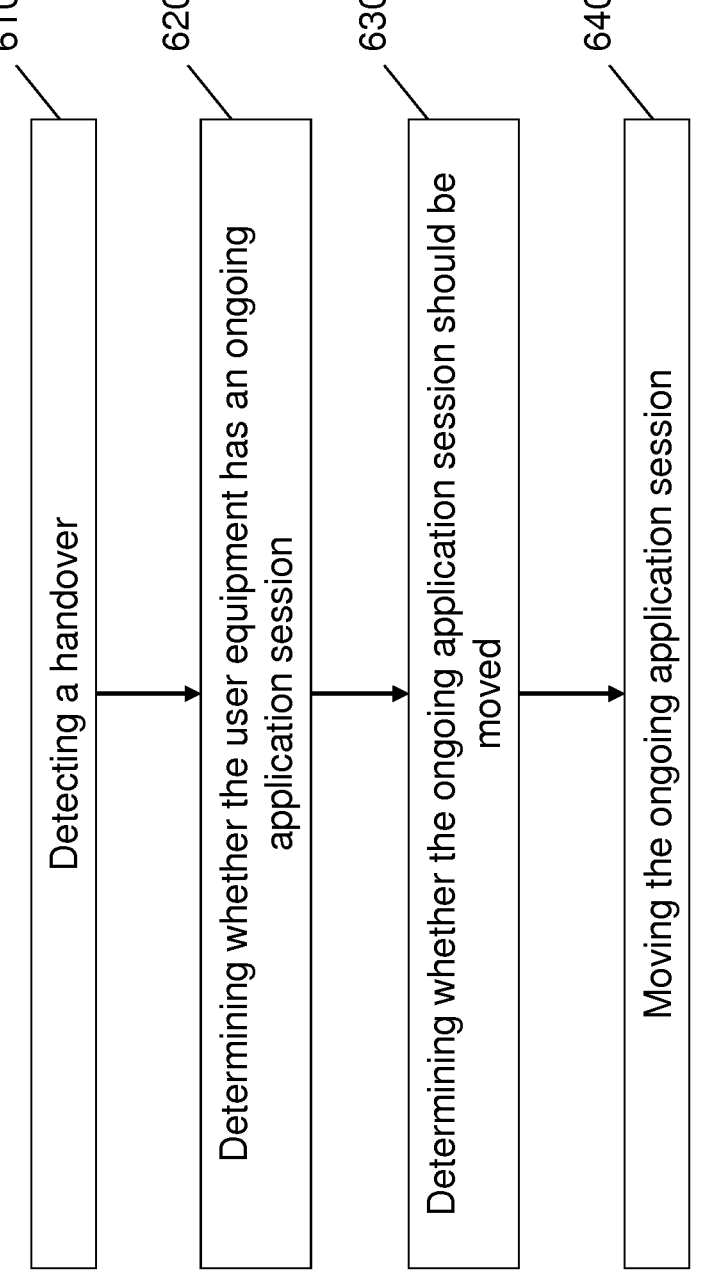
FIG. 6 illustrates a flowchart of a method in accordance with certain embodiments of the invention.

FIG. 6 illustrates a flowchart of a method in accordance with certain embodiments of the invention. The method illustrated in FIG. 6 includes, at 610, detecting, by a detecting mobile-edge-computing server, a handover that is requested by a user equipment. The user equipment moves from a first area of a first mobile-edge-computing server to a second area of a second mobile-edge-computing server. The method also includes, at 620, determining whether the user equipment has an ongoing application session with the first mobile-edge-computing server. The method may also include, at 630, determining whether the ongoing application session should be moved from the first mobile-edge-computing server to the second mobile-edge-computing server, if the user equipment has been determined to have an ongoing application session. The method may also include, at 640, moving the ongoing application session from the first mobile-edge-computing server to the second mobile-edge-computing server, if the application session has been determined to be moved.

Figure 7:
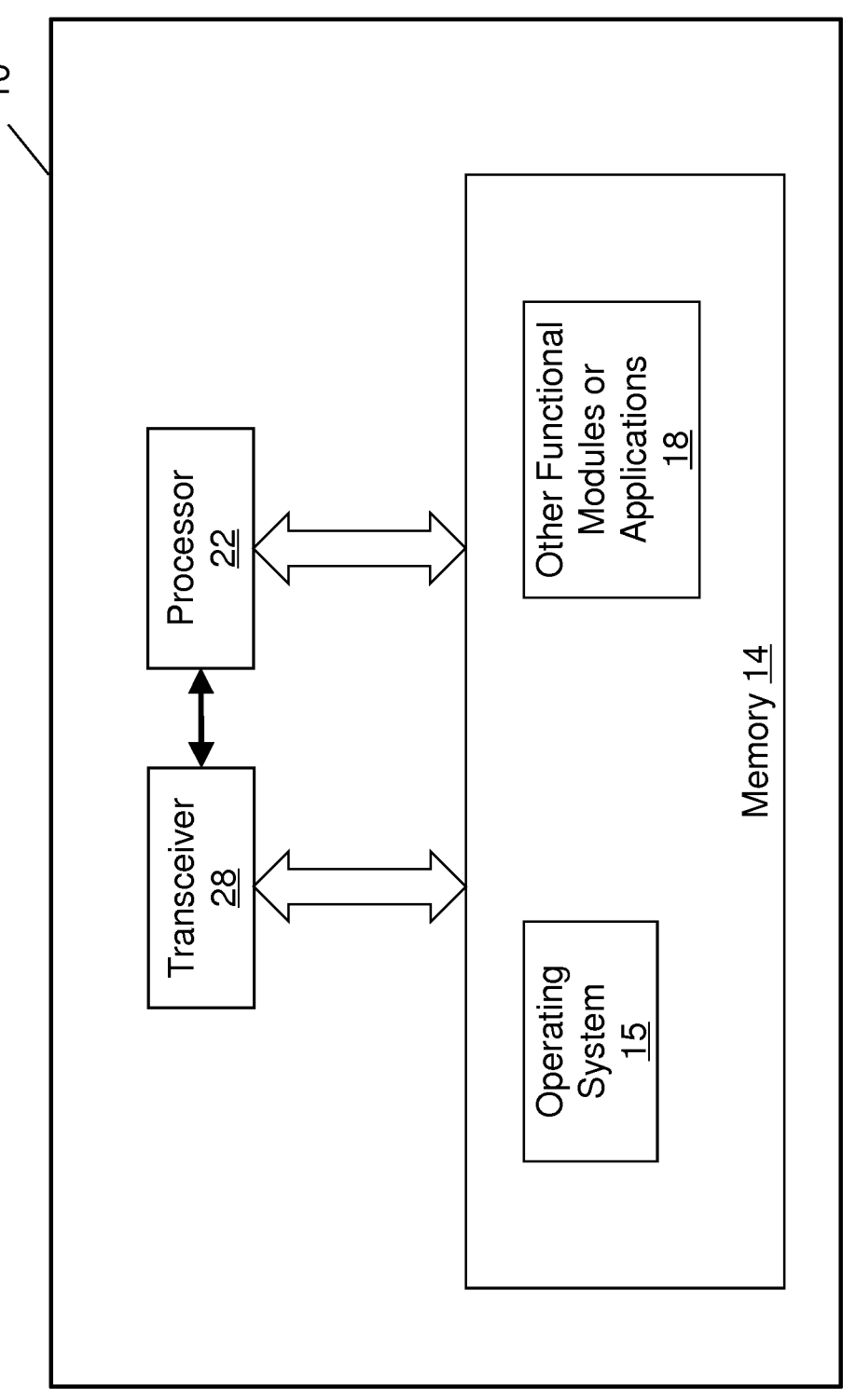
FIG. 7 illustrates an apparatus in accordance with certain embodiments of the invention.

FIG. 7 illustrates an apparatus 10 according to another embodiment. In an embodiment, apparatus 10 may be mobile-edge-computing server. In another embodiment, apparatus 10 may be an access point, base station, and/or an evolved Node B, for example. In another embodiment, apparatus 10 may be a mobility management entity or a controller/orchestrator. In another embodiment, apparatus 10 may be a user equipment.

Apparatus 10 includes a processor 22 for processing information and executing instructions or operations. Processor 22 may be any type of general or specific purpose processor. While a single processor 22 is shown in FIG. 7, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

Figure 8:
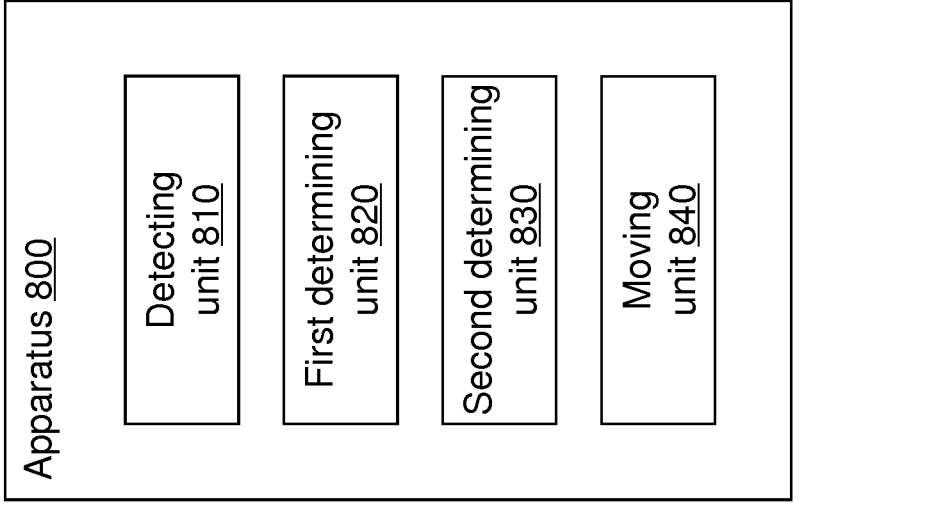
FIG. 8 illustrates another apparatus in accordance with certain embodiments of the invention.

FIG. 8 illustrates another apparatus in accordance with certain embodiments of the invention. Apparatus 800 can be mobile-edge-computing server, for example. Apparatus 800 can include a detecting unit 810 that detects a handover that is requested by a user equipment. The user equipment moves from a first area of a first mobile-edge-computing server to a second area of a second mobile-edge-computing server. Apparatus 800 may also include a first determining unit 820 that determines whether the user equipment has an ongoing application session with the first mobile-edge-computing server. Apparatus 800 may also include a second determining unit 830 that determines whether the ongoing application session should be moved from the first mobile-edge-computing server to the second mobile-edge-computing server, if the user equipment has been determined to have an ongoing application session. Apparatus 800 may also include a moving unit 840 that moves the ongoing application session from the first mobile-edge-computing server to the second mobile-edge-computing server, if the application session has been determined to be moved.

Figure 9:
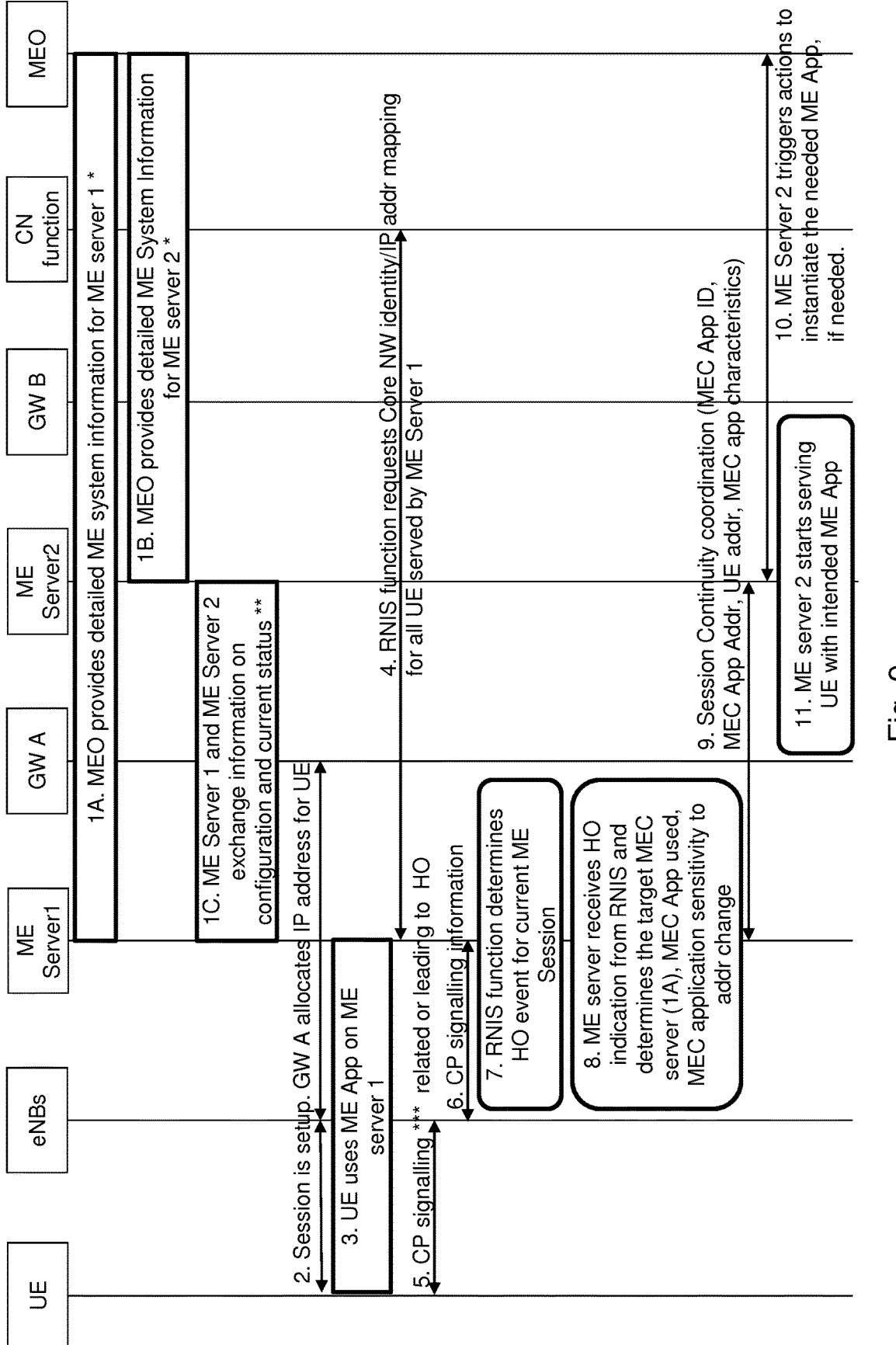
FIG. 9 illustrates a coordinated arrangement for session continuity, in accordance with another embodiment.

FIG. 9 illustrates a coordinated arrangement for session continuity, in accordance with another embodiment. In the embodiment illustrated by FIG. 9, the ME server can also determine the target ME Server from the control plane signaling message related to handover. The Mobile Edge servers are managed by the Mobile Edge Orchestration (MEO) function that manages all the ME servers in a network. MEO may provide detailed ME system information to all Mobile Edge servers. The detailed ME system information may include information on all Mobile Edge servers and Mobile Edge applications, or may include a subset of detailed information based on certain geographical area. The detailed information may further include Mobile Edge Server IDs, Addresses of ME Servers, IDs of all eNBs connected to a ME Server, Addresses of eNB, Geolocation of eNB (with a corresponding latitude/longitude), ME application IDs available in a system from the service catalog, and estimated latencies between the eNBs and ME servers. In addition, the MEO may provide detailed information on the characteristics and the requirements of the Mobile Edge applications. The detecting ME server may identify the target Mobile Edge server based on the received handover information from the RNIS and the detailed ME System information provided by the MEO.

Referring to FIG. 9, at step 1(a), MEO provides detailed system information for ME server 1. At step 1 (b), MEO provides detailed ME system information for ME server 2. At step 1(c), ME Server 1 and ME Server 2 may exchange information relating to a configuration and a current status. At step 2, GW A may allocate an IP address for a UE. At step 3, the UE may use an ME application on ME Server 1. At step 4, RNIS function may request a core NW identity and/or an IP address mapping for all user equipment that are served by ME Server 1. At steps 5 and 6, CP signalling may be exchanged, where the signalling may be related to or may lead to handover. At step 7, RNIS function determines a handover event that has occurred during the current ME session. At step 8, ME server 1 receives a handover indication from RNIS and may determine the target MEC server (1A), the MEC Application, and the MEC application's sensitivity to an address change. At step 9, session continuity coordination may be performed. At step 10, ME server 2 may trigger actions to instantiate a needed ME application. At step 11, ME server 2 may start serving a UE with the intended ME application.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In view of the above, there are provided measures for implementing connectivity and mobility. Such measures exemplarily comprise detecting, by a detecting mobile-edge-computing server, a handover that is requested by a user equipment, wherein the user equipment moves from a first area of a first mobile-edge-computing server to a second area of a second mobile-edge-computing server, determining whether the user equipment has an ongoing application session with the first mobile-edge-computing server, determining whether the ongoing application session should be moved from the first mobile-edge-computing server to the second mobile-edge-computing server, if the user equipment has been determined to have an ongoing application session, and moving the ongoing application session from the first mobile-edge-computing server to the second mobile-edge-computing server, if the application session has been determined to be moved.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
ASIC application-specific integrated circuit
DB database
DSP digital signal processor
eNB evolved Node B
EPC Evolved Packet Core
ETSI European Telecommunications Standards Institute
FPGA field-programmable gate array
IMSI International Mobile Subscriber Identity
IP Internet Protocol
ISG Industry Specification Groups
LTE Long-term Evolution
MEC Mobile-Edge Computing
MEO Mobile Edge Orchestrator
MME Mobility Management Entity
NAT Network Address Translation
P-GW Packet Data Network Gateway
RAM random access memory
RNIS Radio Network Information Service
ROM read only memory
S-GW Serving Gateway
S1AP S1 Application Protocol
S-TMSI SAE-Temporary Mobile Subscriber Identity
TEID Tunnel Endpoint ID
TFT Traffic Flow Template
UE user equipment

The invention claimed is:
1. A first mobile-edge-computing server, comprising:
at least one processor; and
at least one memory including computer program code, the computer program code, when executed by the at least one processor, is configured to cause the first mobile-edge-computing server to perform:
detecting a handover of a user equipment, which has an ongoing application session with an application hosted on the first mobile-edge-computing server, from an evolved Node B of the first mobile-edge-computing server to an evolved Node B of a second mobile-edge-computing server, wherein the detecting the handover is based on at least one of signaling related to the handover, information from a radio network information service, control plane signaling between the evolved Node B of the first mobile-edge-computing server and the evolved Node B of the second mobile-edge-computing server, signaling between the evolved Node B of the first mobile-edge-computing server and a mobility management entity, or information about the handover;
determining to maintain the ongoing application session of the user equipment with the application hosted on the first mobile-edge-computing server;
in response to the determining, transmitting, to the second mobile-edge-computing server, a request to route traffic identified by a traffic flow template that originates from the user equipment and is related to the ongoing application session to the first mobile-edge-computing server, and to route traffic that originates from the application hosted on the first mobile-edge-computing server and is related to the ongoing application session to the user equipment, wherein said request comprises an Internet Protocol address of the first mobile-edge-computing server; and
maintaining the ongoing application session of the user equipment with the application hosted on the first mobile-edge-computing server.
2. The first mobile-edge-computing server according to claim 1, wherein
the computer program code, when executed by the at least one processor, is configured to cause the first mobile-edge-computing server to perform:
identifying the application of the ongoing application session.
3. The first mobile-edge-computing server according to claim 2, wherein, the identifying the application comprises:
identifying a unique internet protocol address of the application.
4. The first mobile-edge-computing server according to claim 3, wherein
said unique internet protocol address of said application is unique in a network comprising said first mobile-edge-computing server.
5. The first mobile-edge-computing server according to claim 1, wherein
the computer program code, when executed by the at least one processor, is configured to cause the apparatus to perform:
deducing, from application-specific information, whether the ongoing application session can be moved to the second mobile-edge-computing server, wherein the application-specific information indicative of whether said application can tolerate or survive a change of an internet protocol address of said application during the ongoing application session is moved to the second mobile-edge-computing server, or is indicative of uniqueness of said internet protocol address of said application.

6. The first mobile-edge-computing server according to claim 1, wherein the computer program code, when executed by the at least one processor, is configured to cause the first mobile-edge-computing server to perform:

identifying a topology of a network based on the information from a radio network information service, the network comprising the first mobile-edge-computing server, the second mobile-edge-computing server, the evolved Node B of the first mobile-edge-computing server and the evolved Node B of the second mobile-edge-computing server, determining a probability of said handover, and initiating, based on said topology, procedures to optimize a handover performance by sending at least one request to instantiate an application corresponding to applications hosted on said first mobile-edge-computing server on said second mobile-edge-computing server in said network.

7. The first mobile-edge-computing server according to claim 1, wherein the computer program code, when executed by the at least one processor, is configured to cause the apparatus to perform:

identifying said second mobile-edge-computing server based on information on the evolved Node B connected to said second mobile-edge-computing server.

8. The first mobile-edge-computing server according to claim 1, wherein the computer program code, when executed by the at least one processor, is configured to cause the first mobile-edge-computing server to perform:

initiating session continuity coordination procedures with the second mobile-edge-computing server.

9. The first mobile-edge-computing server according to claim 8, wherein the computer program code, when executed by the at least one processor, is configured to cause the first mobile-edge-computing server to perform:

informing, as part of said session continuity coordination procedures, said second mobile-edge-computing server about the handover, or providing, as part of said session continuity coordination procedures, to said second mobile-edge-computing server, information on the ongoing application session that is handed over, wherein said information on the ongoing application session that is handed over includes an identifier of the application, an internet protocol addresses of the user equipment, or the internet protocol addresses of the first mobile-edge-computing server.

10. A method comprising:

detecting, by a first mobile-edge-computing server, a handover of a user equipment, which has an ongoing application session with an application hosted on the first mobile-edge-computing server, from an evolved Node B of the first mobile-edge-computing server and an evolved Node B of a second mobile-edge-computing server, wherein detecting the handover is based on at least one of signaling related to the handover, information from a radio network information service, control plane signaling between the evolved Node B of the first mobile-edge-computing server and the evolved Node B of the second mobile-edge-computing server, signaling between the evolved Node B of the first mobile-edge-computing server and a mobility management entity, or information about the handover;

determining, by the first mobile-edge-computing server, to maintain the ongoing application session of the user equipment with the application hosted on the first mobile-edge-computing server;

in response to the determining, transmitting, by the first mobile-edge-computing server, to the second mobile-edge-computing server, a request to route traffic identified by a traffic flow template that originates from the user equipment and is related to the ongoing application session to the first mobile-edge-computing server, and to route traffic that originates from the application hosted on the first mobile-edge-computing server and is related to the ongoing application session to the user equipment, wherein said request comprises an Internet Protocol address of the first mobile-edge-computing server; and maintaining, by the first mobile-edge-computing server, the ongoing application session of the user equipment with the application hosted on the first mobile-edge-computing server.

11. The method according to claim 10, further comprising:

identifying, by the first mobile-edge-computing server, the application of the ongoing application session.

12. The method according to claim 11, wherein the identifying the application comprises:

identifying a unique internet protocol address of the application.

13. The method according to claim 12, wherein said unique internet protocol address of said application is unique in a network comprising the first mobile-edge-computing server.

14. The method according to claim 10, further comprising:

deducing, by the first mobile-edge-computing server, from application-specific information, whether the ongoing application session can be moved to the second mobile-edge-computing server, wherein the application-specific information indicative of whether said application can tolerate or survive a change of an internet protocol address of said application during the ongoing application session moved to the second mobile-edge-computing server, or is indicative of uniqueness of said internet protocol address of said application.

15. The method according to claim 10, further comprising:

identifying, by the first mobile-edge-computing server, a topology of a network based on the information from a radio network information service, the network comprising the first mobile-edge-computing server, the second mobile-edge-computing server, the evolved Node B of the first mobile-edge-computing server and the evolved Node B of the second mobile-edge-computing server;

determining, by the first mobile-edge-computing server, a probability of said handover from said first mobile-edge-computing server to said second mobile-edge-computing server; and initiating, by the first mobile-edge-computing server based on said topology, procedures to optimize a handover performance by sending at least one request to instantiate an application corresponding to applications hosted on said first mobile-edge-computing server on said second mobile-edge-computing server in said network.

16. The method according to claim 10, further comprising:

identifying, by the first mobile-edge-computing server, said second mobile-edge-computing server based on information on the evolved Node B connected to said second mobile-edge-computing server.

17. The method according to claim 10, further comprising:

initiating, by the first mobile-edge-computing server, session continuity coordination procedures with the second mobile-edge-computing server.

18. The method according to claim 17, further comprising:

informing, by the first mobile-edge-computing server as part of said session continuity coordination procedures, said second mobile-edge-computing server about the handover; or providing, as part of said session continuity coordination procedures, to said second mobile-edge-computing server, information on the ongoing application session that is handed over, wherein said information on the ongoing application session that is handed over includes an identifier of the application, an internet protocol addresses of the user equipment, or the internet protocol addresses of the first mobile-edge-computing server.

19. A non-transitory computer-readable medium comprising instructions which, when executed by a processor of a first mobile-edge-computing server, causes the processor to perform:

detecting a handover of a user equipment, which has an ongoing application session with an application hosted on the first mobile-edge-computing server, from an evolved Node B of the first mobile-edge-computing server to an evolved Node B of a second mobile-edge-computing server, wherein detecting the handover is based on at least one of signaling related to the handover, information from a radio network information service, control plane signaling between the evolved Node B of the first mobile-edge-computing server and the evolved Node B of the second mobile-edge-computing server, signaling between the evolved Node B of the first mobile-edge-computing server and a mobility management entity, or information about the handover;

determining to maintain the ongoing application session of the user equipment with the application hosted on the first mobile-edge-computing server;

in response to the determining, transmitting, to the second mobile-edge-computing server, a request to route traffic identified by a traffic flow template that originates from the user equipment and is related to the ongoing application session to the first mobile-edge-computing server, and to route traffic that originates from the application hosted on the first mobile-edge-computing server and is related to the ongoing application session of the user equipment, wherein said request comprises an Internet Protocol address of the first mobile-edge-computing server; and maintaining the ongoing application session of the user equipment with the application hosted on the first mobile-edge-computing server.

* * * * *